US007341781B2

(12) United States Patent
Klug (10) Patent No.: US 7,341,781 B2
(45) Date of Patent: Mar. 11, 2008

(54) MATERIAL USEFUL FOR PREPARING EMBOSSED FLEXIBLE GRAPHITE ARTICLE

(75) Inventor: Jeremy Klug, Brunswick, OH (US)

(73) Assignee: GrafTech International Holdings Inc., Parma, OH (US)

( * ) Notice: Subject to any disclaimer, the term of this patent is extended or adjusted under 35 U.S.C. 154(b) by 0 days.

(21) Appl. No.: 09/826,227

(22) Filed: Apr. 4, 2001

(65) Prior Publication Data

US 2002/0160197 A1 Oct. 31, 2002

(51) Int. Cl.
*B32B 9/00* (2006.01)

(52) U.S. Cl. .................. 428/408; 428/167; 423/414; 423/445 R; 423/448; 264/109; 264/119; 264/128

(58) Field of Classification Search ............ 428/408, 428/167; 423/414, 445 R, 448; 264/109, 264/119, 128
See application file for complete search history.

(56) References Cited

U.S. PATENT DOCUMENTS

| 4,591,166 | A | * | 5/1986 | Atkinson et al. | |
| 4,792,491 | A | | 12/1988 | Atkinson et al. | 428/408 |
| 4,961,991 | A | * | 10/1990 | Howard | |
| 5,521,018 | A | | 5/1996 | Wilkinson et al. | 42/26 |
| 5,527,363 | A | | 6/1996 | Wilkinson et al. | 29/623 |
| 5,570,501 | A | | 11/1996 | Atkinson et al. | 29/527 |
| 6,017,633 | A | * | 1/2000 | Mercuri | |
| 2002/0160250 | A1 | * | 10/2002 | Woods | |

OTHER PUBLICATIONS

"Typical Grafoil Sheet Properties".*

* cited by examiner

*Primary Examiner*—Deborah Jones
*Assistant Examiner*—Wendy Boss
(74) *Attorney, Agent, or Firm*—Waddey & Patterson; James R. Cartiglia (57) ABSTRACT

A material useful in a process for embossing a flexible graphite sheet is presented. The inventive material is a flexible graphite sheet which has a preselected void condition which provides the capability of controlling the morphology, and thus the functional characteristics, of the resulting embossed sheet.

18 Claims, 4 Drawing Sheets

MATERIAL USEFUL FOR PREPARING EMBOSSED FLEXIBLE GRAPHITE ARTICLE

TECHNICAL FIELD

The invention relates to a process for material which can be used in preparing a flexible graphite article that is embossed with a particular pattern thereon. By the practice of the present invention, a material is provided which acts as a substrate to forming an improved article (such as a sheet) of flexible graphite having an embossed pattern thereon. Uses of the inventive material include forming an embossed article which can be used as a component in an electrochemical fuel cell.

BACKGROUND OF THE INVENTION

An ion exchange membrane fuel cell, more specifically a proton exchange membrane (PEM) fuel cell, produces electricity through the chemical reaction of hydrogen and oxygen in the air. Within the fuel cell, electrodes denoted as anode and cathode surround a polymer electrolyte to form what is generally referred to as a membrane electrode assembly (or MEA). Oftentimes, the electrode also function as the gas diffusion layers, or GDL, of the fuel cell. A catalyst material stimulates hydrogen molecules to split into hydrogen atoms and then, at the membrane, the atoms each split into a proton and an electron. The electrons are utilized as electrical energy. The protons migrate through the electrolyte and combine with oxygen and electrons to form water.

A PEM fuel cell is advantageously formed of a membrane electrode assembly sandwiched between two graphite flow field plates. Conventionally, the membrane electrode assembly consists of random-oriented carbon fiber paper electrodes (anode and cathode) with a thin layer of a catalyst material, particularly platinum or a platinum group metal coated on isotropic carbon particles, such as lamp black, bonded to either side of a proton exchange membrane disposed between the electrodes. In operation, hydrogen flows through channels in one of the flow field plates to the anode, where the catalyst promotes its separation into hydrogen atoms and thereafter into protons that pass through the membrane and electrons that flow through an external load. Air flows through the channels in the other flow field plate to the cathode, where the oxygen in the air is separated into oxygen atoms, which joins with the protons through the proton exchange membrane and the electrons through the circuit, and combine to form water. Since the membrane is an insulator, the electrons travel through an external circuit in which the electricity is utilized, and join with protons at the cathode. An air stream on the cathode side is one mechanism by which the water formed by combination of the hydrogen and oxygen can be removed. Combinations of such fuel cells are used in a fuel cell stack to provide the desired voltage.

One limiting factor to the use of flexible graphite materials as components for PEM fuel cells is the definition of a pattern embossed on the material, which, if not sufficient, can interfere with operation of the fuel cell, by either permitting leaking of fluids, or not permitting sufficient fluid flow through the fuel cell. In addition, the thermal and electrical properties of flexible graphite materials, while superior to prior art materials, can still be optimized further.

Graphites are made up of layer planes of hexagonal arrays or networks of carbon atoms. These layer planes of hexagonally arranged carbon atoms are substantially flat and are oriented or ordered so as to be substantially parallel and equidistant to one another. The substantially flat, parallel equidistant sheets or layers of carbon atoms, usually referred to as graphene layers or basal planes, are linked or bonded together and groups thereof are arranged in crystallites. Highly ordered graphites consist of crystallites of considerable size: the crystallites being highly aligned or oriented with respect to each other and having well ordered carbon layers. In other words, highly ordered graphites have a high degree of preferred crystallite orientation. It should be noted that graphites by definition possess anisotropic structures and thus exhibit or possess many properties that are highly directional e.g. thermal and electrical conductivity and fluid diffusion.

Briefly, graphites may be characterized as laminated structures of carbon, that is, structures consisting of superposed layers or laminae of carbon atoms joined together by weak van der Waals forces. In considering the graphite structure, two axes or directions are usually noted, to wit, the "c" axis or direction and the "a" axes or directions. For simplicity, the "c" axis or direction may be considered as the direction perpendicular to the carbon layers. The "a" axes or directions may be considered as the directions parallel to the carbon layers or the directions perpendicular to the "c" direction. The graphites suitable for manufacturing flexible graphite sheets possess a very high degree of orientation.

As noted above, the bonding forces holding the parallel layers of carbon atoms together are only weak van der Waals forces. Natural graphites can be chemically treated so that the spacing between the superposed carbon layers or laminae can be appreciably opened up so as to provide a marked expansion in the direction perpendicular to the layers, that is, in the "c" direction, and thus form an expanded or intumesced graphite structure in which the laminar character of the carbon layers is substantially retained.

Graphite flake which has been chemically or thermally expanded and more particularly expanded so as to have a final thickness or "c" direction dimension which is as much as about 80 or more times the original "c" direction dimension can be formed without the use of a binder into cohesive or integrated sheets of expanded graphite, e.g. webs, papers, strips, tapes, or the like (typically referred to as "flexible graphite"). The formation of graphite particles which have been expanded to have a final thickness or "c" dimension which is as much as about 80 times or more the original "c" direction dimension into integrated flexible sheets by compression, without the use of any binding material, is believed to be possible due to the mechanical interlocking, or cohesion, which is achieved between the voluminously expanded graphite particles.

In addition to flexibility, the sheet material, as noted above, has also been found to possess a high degree of anisotropy with respect to thermal and electrical conductivity and fluid diffusion, comparable to the natural graphite starting material due to orientation of the expanded graphite particles substantially parallel to the opposed faces of the sheet resulting from very high compression, e.g. roll pressing. Sheet material thus produced has excellent flexibility, good strength and a very high degree of orientation.

Briefly, the process of producing flexible, binderless anisotropic graphite sheet material, e.g. web, paper, strip, tape, foil, mat, or the like, comprises compressing or compacting under a predetermined load and in the absence of a binder, expanded graphite particles which have a "c" direction dimension which is as much as about 80 or more times that of the original particles so as to form a substantially flat, flexible, integrated graphite sheet. The expanded graphite particles that generally are worm-like or vermiform in appearance, once compressed, will maintain the compression set and alignment with the opposed major surfaces of the sheet. The density and thickness of the sheet material can be varied by controlling the degree of compression. The density of the sheet material can be within the range of from about 0.04 g/cc to about 1.4 g/cc. The flexible graphite sheet material exhibits an appreciable degree of anisotropy due to the alignment of graphite particles parallel to the major opposed, parallel surfaces of the sheet, with the degree of anisotropy increasing upon roll pressing of the sheet material to increased density. In roll pressed anisotropic sheet material, the thickness, i.e. the direction perpendicular to the opposed, parallel sheet surfaces comprises the "c" direction and the directions ranging along the length and width, i.e. along or parallel to the opposed, major surfaces comprises the "a" directions and the thermal, electrical and fluid diffusion properties of the sheet are very different, by orders of magnitude typically, for the "c" and "a" directions.

This considerable difference in properties, i.e. anisotropy, which is directionally dependent, can be disadvantageous in some applications. For example, in gasket applications where flexible graphite sheet is used as the gasket material and in use is held tightly between metal surfaces, the diffusion of fluid, e.g. gases or liquids, occurs more readily parallel to and between the major surfaces of the flexible graphite sheet. It would, in most instances, provide for greater gasket performance, if the resistance to fluid flow parallel to the major surfaces of the graphite sheet ("a" direction) were increased, even at the expense of reduced resistance to fluid diffusion flow transverse to the major faces of the graphite sheet ("c" direction). With respect to electrical properties, the resistivity of anisotropic flexible graphite sheet is high in the direction transverse to the major surfaces ("c" direction) of the flexible graphite sheet, and substantially less in the direction parallel to the major faces of the flexible graphite sheet ("a" direction). In applications such as electrodes for fuel cells, it would be of advantage if the electrical resistance transverse to the major surfaces of the flexible graphite sheet ("c" direction) were decreased, even at the expense of an increase in electrical resistivity in the direction parallel to the major faces of the flexible graphite sheet ("a" direction).

With respect to thermal properties, the thermal conductivity of a flexible graphite sheet in a direction parallel to the major surfaces of the flexible graphite sheet is relatively high, while it is relatively low in the "c" direction transverse to the major surfaces.

Flexible graphite sheet can be provided with channels, which are preferably smooth-sided, and which pass between the parallel, opposed surfaces of the flexible graphite sheet and are separated by walls of compressed expanded graphite. When the flexible graphite sheet functions as an electrode in an electrochemical fuel cell, and is placed so as to abut the ion exchange membrane, so that the "tops" of the walls of the flexible graphite sheet abut the ion exchange membrane.

A material for use in a process permitting the embossing of a high definition pattern on a flexible graphite sheet, to provide a material uniquely capable of use as a component in a PEM fuel cell, is addressed by the present invention.

SUMMARY OF THE INVENTION

The present invention provides a material suitable for use in forming an embossed article for use in a PEM fuel cell. The material is formed of a sheet of a compressed mass of expanded graphite particles having a void condition (and, concomitantly in many cases, density) controlled so as to permit formation of an embossed article having a controlled morphology. By controlling the void condition of the sheet, and thus the morphology of the embossed article, certain characteristics of the embossed article can be controlled. For instance, the thermal anisotropy ratio (that is, the ratio of in-plane thermal conductivity to through-the-plane thermal conductivity) can be controlled so as to provide a thermal anisotropy determined to provide a desired heat dissipation capability. Likewise, control of electrical anisotropy can be advantageous in the same manner.

The embossed pattern is advantageously formed in the inventive material by mechanically impacting an opposed surface of the graphite sheet to displace graphite within the sheet at predetermined locations to provide a channel pattern. The transverse fluid channels are separated by walls (the tops of which are often referred to as lands) of compressed expanded graphite.

The process involves providing an embossing apparatus which generally comprises two opposed elements, one of the two opposed elements comprising an embossing element having an embossing pattern thereon, the embossing pattern formed by arraying a series of walls having lands (i.e., wall tops) which are a predetermined height from the surface of the embossing element and channel floors, about the embossing element; and the other of the two opposed elements comprising a landing element having an impact surface, wherein the embossing element and landing element are arrayed in the embossing apparatus such that the impact surface of the landing element is separated from the channel floors of the embossing element by a distance "d" which is at least equal to (and preferably greater than) the height of the lands; embossing the inventive flexible graphite sheet material by passing it between the embossing element and the landing element of the embossing apparatus such that the lands of the embossing element exert pressure on the flexible graphite sheet, wherein the flexible graphite sheet has a thickness in the region of the embossing pattern prior to embossing which is less than distance "d", but greater than the distance between the impact surface of the landing element and the lands of the embossing element, thus forming a gap between the flexible graphite sheet and the channel floors of the embossing element, further wherein embossing of the flexible graphite sheet in the embossing apparatus causes material to flow from the area of the flexible graphite sheet which encounters pressure from the lands of the embossing element to the gap between the flexible graphite sheet and the channel floors of the embossing element.

The inventive sheet is preferably impregnated with resin, such as an acrylic-, epoxy- or phenolic-based resin system, prior to embossing, and advantageously the resin is cured after the flexible graphite sheet is embossed. The resin content of the resin-impregnated flexible graphite sheet material is preferably at least about 5%, and more preferably at least about 10%, by weight.

BRIEF DESCRIPTION OF THE DRAWINGS

The present invention will be better understood and its advantages more apparent in view of the following detailed description, especially when read with reference to the appended drawings, wherein.

DETAILED DESCRIPTION OF THE INVENTION

Graphite is a crystalline form of carbon comprising atoms covalently bonded in flat layered planes with weaker bonds between the planes. By treating particles of graphite, such as natural graphite flake, with an intercalant of, e.g. a solution of sulfuric and nitric acid, the crystal structure of the graphite reacts to form a compound of graphite and the intercalant. The treated particles of graphite are hereafter referred to as "particles of intercalated graphite." Upon exposure to high temperature, the intercalant within the graphite decomposes and volatilizes, causing the particles of intercalated graphite to expand in dimension as much as about 80 or more times its original volume in an accordion-like fashion in the "c" direction, i.e. in the direction perpendicular to the crystalline planes of the graphite. The exfoliated graphite particles are vermiform in appearance, and are therefore commonly referred to as worms. The worms may be compressed together into flexible sheets that, unlike the original graphite flakes, can be formed and cut into various shapes and provided with small transverse openings by deforming mechanical impact.

Graphite starting materials suitable for use in the present invention include highly graphitic carbonaceous materials capable of intercalating organic and inorganic acids as well as halogens and then expanding when exposed to heat. These highly graphitic carbonaceous materials most preferably have a degree of graphitization of about 1.0. As used in this disclosure, the term "degree of graphitization" refers to the value g according to the formula:

$$g = \frac{3.45 - d(002)}{0.095}$$

where d(002) is the spacing between the graphitic layers of the carbons in the crystal structure measured in Angstrom units. The spacing d between graphite layers is measured by standard X-ray diffraction techniques. The positions of diffraction peaks corresponding to the (002), (004) and (006) Miller Indices are measured, and standard least-squares techniques are employed to derive spacing which minimizes the total error for all of these peaks. Examples of highly graphitic carbonaceous materials include natural graphites from various sources, as well as other carbonaceous materials such as carbons prepared by chemical vapor deposition and the like. Natural graphite is most preferred.

The graphite starting materials used in the present invention may contain non-carbon components so long as the crystal structure of the starting materials maintains the required degree of graphitization and they are capable of exfoliation. Generally, any carbon-containing material, the crystal structure of which possesses the required degree of graphitization and which can be intercalated and exfoliated, is suitable for use with the present invention. Such graphite preferably has an ash content of less than six weight percent. More preferably, the graphite employed for the present invention will have a purity of at least about 98%. In the most preferred embodiment, the graphite employed will have a purity of at least about 99%.

A common method for manufacturing graphite sheet is described by Shane et al. in U.S. Pat. No. 3,404,061, the disclosure of which is incorporated herein by reference. In the typical practice of the Shane et al. method, natural graphite flakes are intercalated by dispersing the flakes in a solution containing e.g., a mixture of nitric and sulfuric acid, advantageously at a level of about 20 to about 300 parts by weight of intercalant solution per 100 parts by weight of graphite flakes (pph). The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid. Alternatively, an electric potential can be used to bring about oxidation of the graphite. Chemical species that can be introduced into the graphite crystal using electrolytic oxidation include sulfuric acid as well as other acids.

In a preferred embodiment, the intercalating agent is a solution of a mixture of sulfuric acid, or sulfuric acid and phosphoric acid, and an oxidizing agent, i.e. nitric acid, perchloric acid, chromic acid, potassium permanganate, hydrogen peroxide, iodic or periodic acids, or the like. The intercalation solution may also contain metal halides such as ferric chloride, and ferric chloride mixed with sulfuric acid, or a halide, such as bromine as a solution of bromine and sulfuric acid or bromine in an organic solvent.

The quantity of intercalation solution may range from about 20 to about 150 pph and more typically about 50 to about 120 pph. After the flakes are intercalated, any excess solution is drained from the flakes and the flakes are water-washed. Alternatively, the quantity of the intercalation solution may be limited to between about 10 and about 50 pph, which permits the washing step to be eliminated as taught and described in U.S. Pat. No. 4,895,713, the disclosure of which is also herein incorporated by reference.

The particles of graphite flake treated with intercalation solution can optionally be contacted, e.g. by blending, with a reducing organic agent selected from alcohols, sugars, aldehydes and esters which are reactive with the surface film of oxidizing intercalating solution at temperatures in the range of 25° C. and 125° C. Suitable specific organic agents include hexadecanol, octadecanol, 1-octanol, 2-octanol, decylalcohol, 1, 10 decanediol, decylaldehyde, 1-propanol, 1,3 propanediol, ethyleneglycol, polypropylene glycol, dextrose, fructose, lactose, sucrose, potato starch, ethylene glycol monostearate, diethylene glycol dibenzoate, propylene glycol monostearate, glycerol monostearate, dimethyl oxylate, diethyl oxylate, methyl formate, ethyl formate, ascorbic acid and lignin-derived compounds, such as sodium lignosulfate. The amount of organic reducing agent is suitably from about 0.5 to 4% by weight of the particles of graphite flake.

The use of an expansion aid applied prior to, during or immediately after intercalation can also provide improvements. Among these improvements can be reduced exfoliation temperature and increased expanded volume (also referred to as "worm volume"). An expansion aid in this context will advantageously be an organic material sufficiently soluble in the intercalation solution to achieve an improvement in expansion. More narrowly, organic materials of this type that contain carbon, hydrogen and oxygen, preferably exclusively, may be employed. Carboxylic acids have been found especially effective. A suitable carboxylic acid useful as the expansion aid can be selected from aromatic, aliphatic or cycloaliphatic, straight chain or branched chain, saturated and unsaturated monocarboxylic acids, dicarboxylic acids and polycarboxylic acids which have at least 1 carbon atom, and preferably up to about 15 carbon atoms, which is soluble in the intercalation solution in amounts effective to provide a measurable improvement of one or more aspects of exfoliation. Suitable organic solvents can be employed to improve solubility of an organic expansion aid in the intercalation solution.

Representative examples of saturated aliphatic carboxylic acids are acids such as those of the formula $H(CH_2)_n COOH$ wherein n is a number of from 0 to about 5, including formic, acetic, propionic, butyric, pentanoic, hexanoic, and the like. In place of the carboxylic acids, the anhydrides or reactive carboxylic acid derivatives such as alkyl esters can also be employed. Representative of alkyl esters are methyl formate and ethyl formate. Sulfuric acid, nitric acid and other known aqueous intercalants have the ability to decompose formic acid, ultimately to water and carbon dioxide. Because of this, formic acid and other sensitive expansion aids are advantageously contacted with the graphite flake prior to immersion of the flake in aqueous intercalant. Representative of dicarboxylic acids are aliphatic dicarboxylic acids having 2–12 carbon atoms, in particular oxalic acid, fumaric acid, malonic acid, maleic acid, succinic acid, glutaric acid, adipic acid, 1,5-pentanedicarboxylic acid, 1,6-hexanedicarboxylic acid, 1,10-decanedicarboxylic acid, cyclohexane-1,4-dicarboxylic acid and aromatic dicarboxylic acids such as phthalic acid or terephthalic acid. Representative of alkyl esters are dimethyl oxylate and diethyl oxylate. Representative of cycloaliphatic acids is cyclohexane carboxylic acid and of aromatic carboxylic acids are benzoic acid, naphthoic acid, anthranilic acid, p-aminobenzoic acid, salicylic acid, o-, m- and p-tolyl acids, methoxy and ethoxybenzoic acids, acetoacetamidobenzoic acids and, acetamidobenzoic acids, phenylacetic acid and naphthoic acids. Representative of hydroxy aromatic acids are hydroxybenzoic acid, 3-hydroxy-1-naphthoic acid, 3-hydroxy-2-naphthoic acid, 4-hydroxy-2-naphthoic acid, 5-hydroxy-1-naphthoic acid, 5-hydroxy-2-naphthoic acid, 6-hydroxy-2-naphthoic acid and 7-hydroxy-2-naphthoic acid. Prominent among the polycarboxylic acids is citric acid.

The intercalation solution will be aqueous and will preferably contain an amount of expansion aid of from about 1 to 10%, the amount being effective to enhance exfoliation. In the embodiment wherein the expansion aid is contacted with the graphite flake prior to or after immersing in the aqueous intercalation solution, the expansion aid can be admixed with the graphite by suitable means, such as a V-blender, typically in an amount of from about 0.2% to about 10% by weight of the graphite flake.

After intercalating the graphite flake, and following the blending of the intercalant coated intercalated graphite flake with the organic reducing agent, the blend is exposed to temperatures in the range of 25° to 125° C. to promote reaction of the reducing agent and intercalant coating. The heating period is up to about 20 hours, with shorter heating periods, e.g., at least about 10 minutes, for higher temperatures in the above-noted range. Times of one half hour or less, e.g., on the order of 10 to 25 minutes, can be employed at the higher temperatures.

The thus treated particles of graphite are sometimes referred to as "particles of intercalated graphite." Upon exposure to high temperature, e.g. temperatures of at least about 160° C. and especially about 700° C. to 1000° C. and higher, the particles of intercalated graphite expand as much as about 80 to 1000 or more times their original volume in an accordion-like fashion in the c-direction, i.e. in the direction perpendicular to the crystalline planes of the constituent graphite particles. The expanded, i.e. exfoliated, graphite particles are vermiform in appearance, and are therefore commonly referred to as worms. The worms may be compressed together into flexible sheets that, unlike the original graphite flakes, can be formed and cut into various shapes and provided with small transverse openings by deforming mechanical impact as hereinafter described.

Flexible graphite sheet and foil are coherent, with good handling strength, and are suitably compressed, e.g. by roll-pressing, to a thickness of about 0.075 mm to 3.75 mm and a typical density of about 0.1 to 1.4 grams per cubic centimeter (g/cc). From about 1.5–30% by weight of ceramic additives can be blended with the intercalated graphite flakes as described in U.S. Pat. No. 5,902,762 (which is incorporated herein by reference) to provide enhanced resin impregnation in the final flexible graphite product. The additives include ceramic fiber particles having a length of about 0.15 to 1.5 millimeters. The width of the particles is suitably from about 0.04 to 0.004 mm. The ceramic fiber particles are non-reactive and non-adhering to graphite and are stable at temperatures up to about 1100° C., preferably about 1400° C. or higher. Suitable ceramic fiber particles are formed of macerated quartz glass fibers, carbon and graphite fibers, zirconia, boron nitride, silicon carbide and magnesia fibers, naturally occurring mineral fibers such as calcium metasilicate fibers, calcium aluminum silicate fibers, aluminum oxide fibers and the like.

The flexible graphite sheet can also, at times, be advantageously treated with resin and the absorbed resin, after curing, enhances the moisture resistance and handling strength, i.e. stiffness, of the flexible graphite sheet, as well as "fixing" the morphology of the sheet. Suitable resin content is preferably at least about 5% by weight, more preferably about 10 to 35% by weight, and suitably up to about 60% by weight. Resins found especially useful in the practice of the present invention include acrylic-, epoxy- and phenolic-based resin systems, or mixtures thereof. Suitable epoxy resin systems include those based on diglycidyl ether of bisphenol A (DGEBA) and other multifunctional resin systems; phenolic resins that can be employed include resole and novolak phenolics. Typically, but not necessarily, the resin system is solvated to facilitate application into the flexible graphite sheet.

In a typical resin impregnation step, the flexible graphite sheet is passed through a vessel and impregnated with the resin system from, e.g. spray nozzles, the resin system advantageously being "pulled through the mat" by means of a vacuum chamber. The resin is thereafter preferably dried, reducing the tack of the resin and the resin-impregnated sheet, which has a starting density of about 0.1 to about 1.1 g/cc, is thereafter processed to change the void condition of the sheet. By void condition is meant the percentage of the sheet represented by voids, which are generally found in the form of entrapped air. Generally, this is accomplished by the application of pressure to the sheet (which also has the effect of densifying the sheet) so as to reduce the level of voids in the sheet, for instance in a calender mill or platen press. Advantageously, the flexible graphite sheet is densified to a density of at least about 1.3 g/cc (although the presence of resin in the system can be used to reduce the voids without requiring densification to so high a level).

The void condition can be used advantageously to control and adjust the morphology and functional characteristics of the final embossed article. For instance, thermal and electrical conductivity, permeation rate and leaching characteristics can be effected and potentially controlled by controlling the void condition (and, usually, the density) of the sheet prior to embossing. Thus, if a set of desired characteristics of the final embossed article is recognized prior to manipulation of the void condition, the void condition can be tailored to achieve those characteristics, to the extent possible.

Most advantageously, especially when the final embossed article is intended for use as a component in an electrochemical fuel cell, the resin-impregnated flexible graphite sheet is manipulated so as to be relatively void-free, to optimize electrical and thermal conductivities for fuel cell applications. Generally, this is accomplished by achieving a density of at least about 1.4 g/cc, more preferably at least about 1.7 g/cc, indicating a relatively void-free condition, which leads to production of an embossed article having a relatively high anisotropy ratio (potentially on the order of about 150 and higher). Where a lower anisotropy ratio is desired, such as in certain heat spreader applications, a higher void condition density is preferred, which generally corresponds to a density in the range of about 1.1 to about 1.3 g/cc (again, depending on the presence/level of resin in the system).

Figure 3:
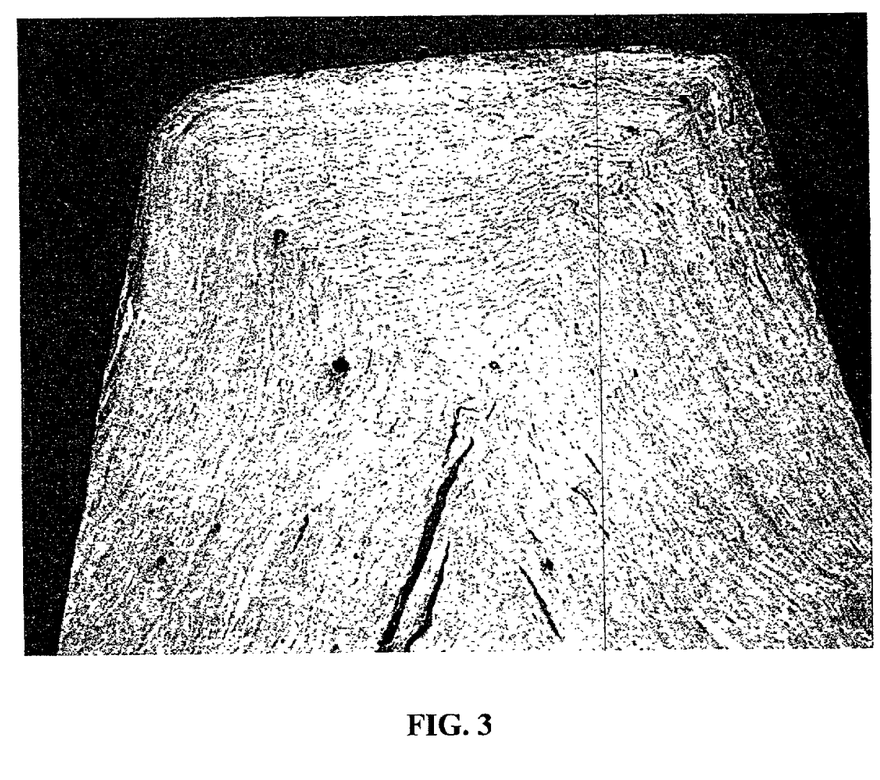
FIGS. 3, 4 are photomicrographs, at a magnification of 50× of a cross-section of one of the walls of an embossed flexible graphite sheet prepared in accordance with the present inventions, showing morphologies achievable using void-free (FIG. 3) and non-void-free (FIG. 4) flexible graphite sheet.
Figure 4:
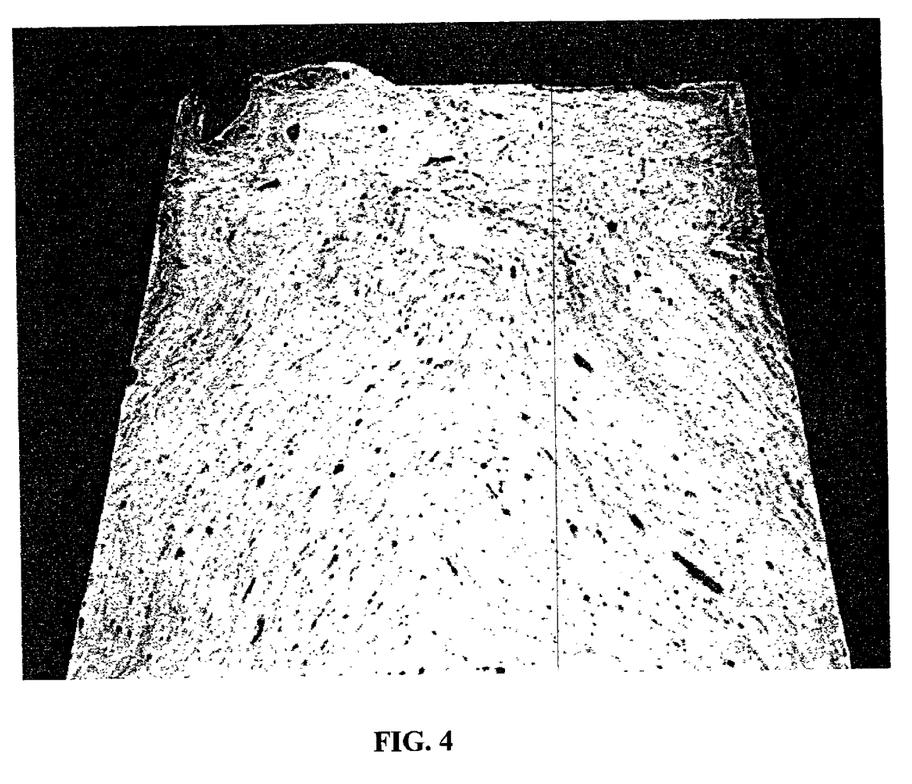

Referring now to FIGS. 3, 4, photomicrographs of a cross section of a wall of each of two sheets prepared using the material of the present invention are presented. The sheet of FIG. 3 was manipulated to a relatively void-free condition prior to embossing. The sheet of FIG. 4 was not manipulated at all prior to embossing. The differences in morphology are apparent. It can readily be seen in FIG. 3 that the graphene layers are more aligned with (i.e., parallel to) the surfaces of the wall. Indeed, an "inverted triangle" region is evident at the upper portion of the wall and there appears a line of intersection where the graphite flow fronts meet, essentially dividing the internal structure of the wall into relatively symmetric parts. When this is contrasted with the wall of FIG. 4, the structure created by control of void condition is apparent. As would be familiar to the skilled artisan, the relative amount of structure in an embossed flexible graphite wall can and will lead to differing properties, as described above.

The calendered flexible graphite sheet is then passed through an embossing apparatus as described hereinbelow, and thereafter heated in an oven to cure the resin. Depending on the nature of the resin system employed, and especially the solvent type and level employed (which is advantageously tailored to the specific resin system, as would be familiar to the skilled artisan), a vaporization drying step may be included prior to the embossing step. In this drying step, the resin impregnated flexible graphite sheet is exposed to heat to vaporize and thereby remove some or all of the solvent, without effecting cure of the resin system. In this way, blistering during the curing step, which can be caused by vaporization of solvent trapped within the sheet by the densification of the sheet during surface shaping, is avoided. The degree and time of heating will vary with the nature and amount of solvent, and is preferably at a temperature of at least about 65° C. and more preferably from about 80° C. to about 95° C. for about 3 to about 20 minutes for this purpose.

One embodiment of an apparatus for continuously forming resin-impregnated and calendered flexible graphite sheet is shown in International Publication No. WO 00/64808 the disclosure of which is incorporated herein by reference.

Figure 2:
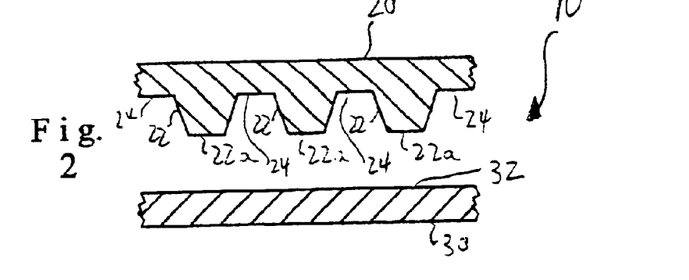
FIG. 2 is a partial cross-sectional view of an embodiment of an embossing apparatus useful in the process of the present invention.
Figures 2A, 2B, 5:
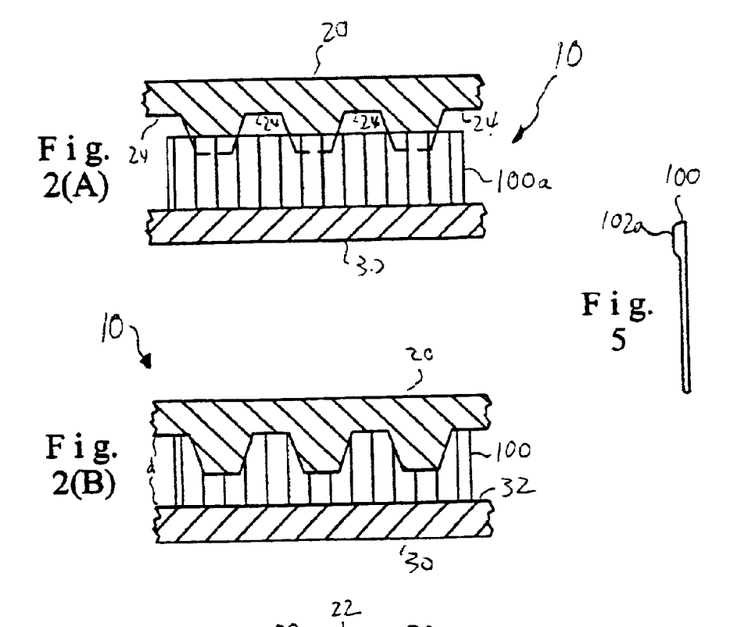
FIG. 2(A) is a partial cross-sectional view of an embodiment of an embossing apparatus useful in the process of the present invention, seen immediately as embossing begins.
FIG. 2(B) is the embossing apparatus of FIG. 2, seen as embossing occurs.
FIG. 5 is a side plan view of an embossed flexible graphite sheet having a "fin" or "ridge," as described hereinbelow.
Figure 2C:
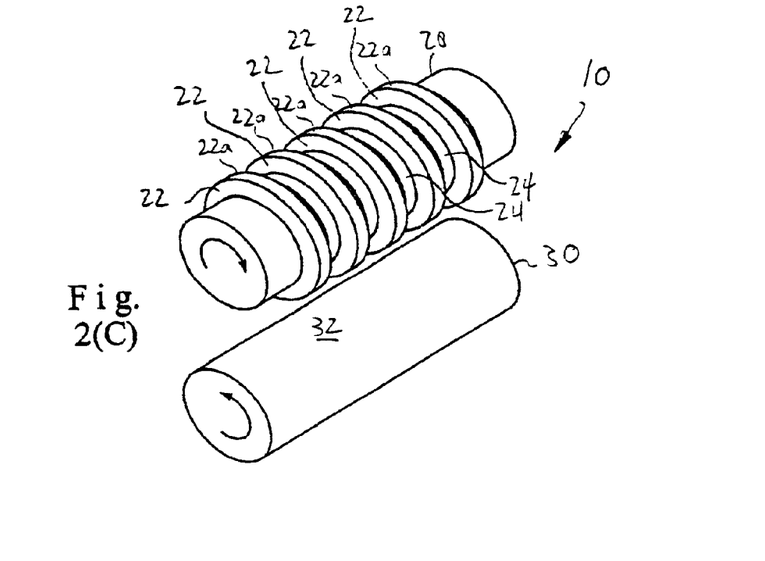
FIG. 2(C) shows a perspective view of the embossing apparatus of FIG. 2.

As illustrated in FIGS. 2–2(C), an embossing apparatus 10 generally comprises two opposed elements 20 and 30, at least one of which is an embossing element 20, and has an embossing pattern thereon. The embossing pattern is formed by arraying a series of walls 22, having tops, or lands, 22a having a predetermined height from the surface of embossing element 20, separated by channel floors 24, about the surface of embossing element 20. Typically, channel floors 24 are in fact the surface of embossing element 20. Landing element 30 preferably comprises a generally flat-surfaced element against which embossing element 20 operates to force the embossing pattern onto the resin-impregnated flexible graphite sheet. The impact surface 32 of landing element 30 can also have textures or other artifacts (not shown) to facilitate the embossing process or apply a desired texture or pattern to the non-embossed surface of the flexible graphite sheet.

Moreover, since it is anticipated that the pattern embossed on flexible graphite sheet can vary, the situation will potentially occur where certain areas of flexible graphite sheet 100 will have different cross-sectional area than others. In such instances, it may be desirable to apply a structure to impact surface 32 of landing element 30 (such as a depression) (not shown) to permit flow of graphite/resin into the depression in low cross-sectional regions of flexible graphite sheet 100, so as to maintain relatively uniform upper (or operational) surface of flexible graphite sheet 100. The resulting flexible graphite sheet 100 will have a "fin" or "ridge" 102a on its underside, as shown in FIG. 5, which can be utilized or removed (such as by machining).

Embossing element 20 and landing element 30 can comprise rollers, plates, a combination thereof, or other structures, provided they are capable of cooperating to emboss a pattern on a flexible graphite sheet, and preferably comprise rollers, as shown in FIG. 2(C). Embossing element 20 and landing element 30 are arrayed in embossing apparatus 10 such that surface 32 of landing element 30 is separated from channel floors 24 of embossing element 20 by a distance "d" which is at least equal to the height of walls 22. Indeed, in the most preferred embodiment, surface 32 of landing element 30 is separated from channel floors 24 of embossing element 20 by distance "d" which is equal to the height of walls 22 plus the desired thickness of the embossed flexible graphite sheet 100 at the location of sheet floors 102 of flexible graphite sheet 100.

Figure 1:
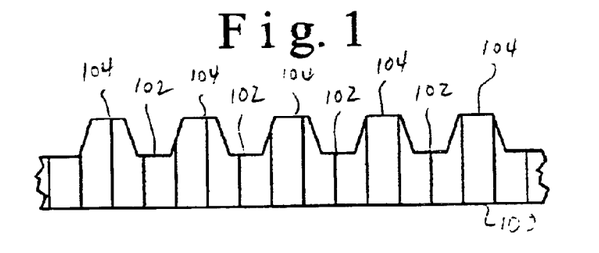
FIG. 1 is a partial side cross-sectional plan view of an embossed graphite article produced in accordance with the present invention.
Figure 1A:
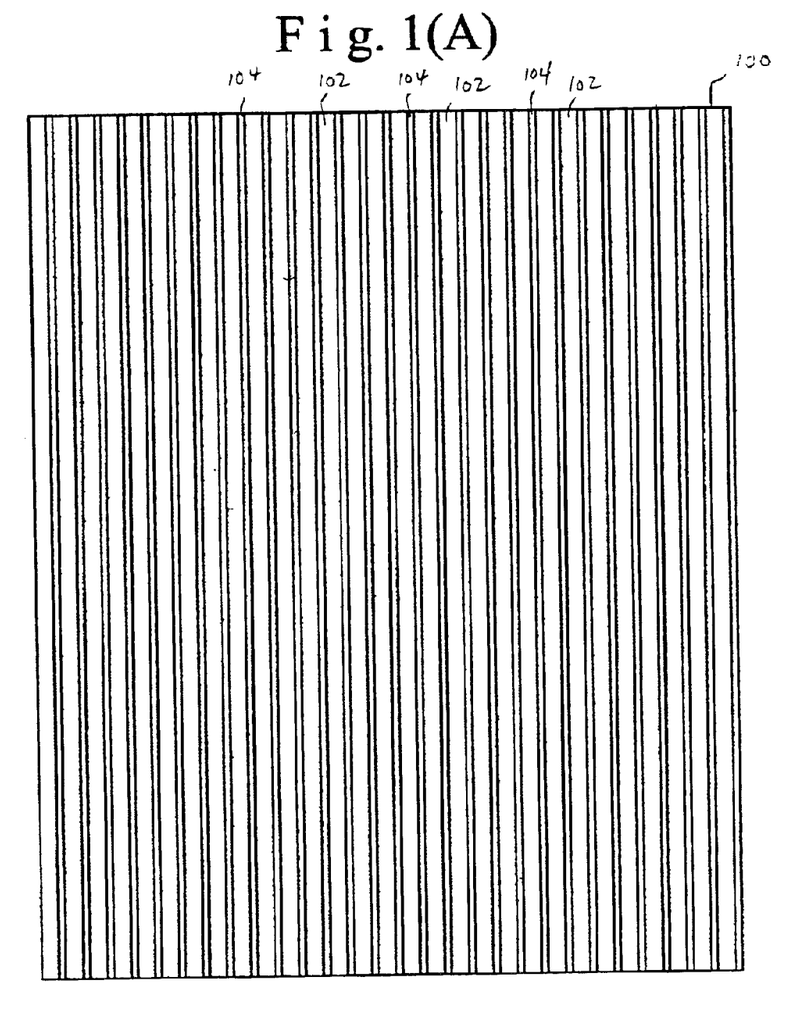
FIG. 1(A) is a top plan view of the sheet of FIG. 1.

The calendered and resin-impregnated flexible graphite sheet 100a is formed so as to have a thickness in the region of the embossing pattern prior to embossing which is less than distance "d", but greater than the distance between surface 32 of landing element 30 and lands 22a of walls 22 of embossing element 20, as illustrated in FIG. 2. During embossing, material (i.e., graphite and resin) in sheet 100a flow from the area of sheet 100a which encounters pressure from lands 22a of embossing element 20 pressing against sheet 100*a* to the gap between sheet 100*a* and channel floors 24 of embossing element 20, as illustrated in FIGS. 2–2(B). This "rearrangement" of the graphite/resin of calendered and resin-impregnated flexible graphite sheet 100*a* is surprising, and leads to an embossed flexible graphite sheet 100, having sheet floors 102 and sheet lands 104 which form a channel pattern corresponding to the embossing pattern of embossing element 20 (as shown in FIGS. 1 and 1(A)), the channel pattern of sheet 100 having improved channel definition as compared to prior art processes.

The resulting embossed graphite sheet can be used in a variety of applications, including as a component in an electrochemical fuel cell.

The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. A material useful as a substrate for an embossed flexible graphite sheet having a predetermined morphology, the material comprising a flexible graphite sheet formed of compressed particle of exfoliated graphite having a void condition selected to produce the predetermined morphology upon embossing.

2. The material of claim 1 wherein the flexible graphite sheet is relatively void-free prior to embossing.

3. The material of claim 1 wherein the flexible graphite sheet is subjected to the application of pressure to provide the selected void condition.

4. The material of claim 3 wherein the flexible graphite sheet is densified to a density of at least about 1.1 g/cc prior to embossing.

5. The material of claim 1 wherein the flexible graphite sheet is impregnated with resin.

6. The material of claim 5 wherein the resin is present at a level of at least about 5% in the flexible graphite sheet.

7. The material of claim 6 wherein the resin comprises an acrylic-based resin system, an epoxy-based resin system or a phenolic-based resin system.

8. The material of claim 5 wherein the flexible graphite sheet is to be embossed in an embossing apparatus comprising an embossing element comprising walls having lands and a landing element comprising a surface, and the flexible graphite sheet has a thickness less than the height of the walls of the embossing element employed.

9. The material of claim 8 wherein the flexible graphite sheet has a thickness less than the height of the walls of the embossing element but greater than the distance between the surface of the landing element and the lands of the walls of the embossing element.

10. A process for producing a material useful as a substrate for an embossed flexible graphite sheet having a predetermined morphology, the material comprising a flexible graphite sheet formed of compressed particles of exfoliated graphite having a void condition selected to produce the predetermined morphology upon embossing, the process comprising forming a flexible graphite sheet and manipulating the void condition of the flexible graphite sheet to produce the selected void condition.

11. The process of claim 10 wherein the flexible graphite sheet is manipulated so as to be relatively void-free prior to embossing.

12. The process of claim 10 wherein the flexible graphite sheet is subjected to the application of pressure to provide the selected void condition.

13. The process of claim 12 wherein the flexible graphite sheet is densified to a density of at least about 1.1 g/cc prior to embossing.

14. The process of claim 10 wherein the flexible graphite sheet is impregnated with resin.

15. The process of claim 14 wherein the resin is present at a level of at least about 5% in the flexible graphite sheet.

16. The process of claim 15 wherein the resin comprises an acrylic-based resin system, an epoxy-based resin system or a phenolic-based resin system.

17. The material of claim 1 wherein the predetermined morphology is selected to provide an embossed flexible graphite sheet having desired physical characteristics.

18. The process of claim 10 wherein the predetermined morphology is selected to provide an embossed flexible graphite sheet having desired physical characteristics.

* * * * *